United States Patent
Janousek et al.

(10) Patent No.: US 6,737,186 B2
(45) Date of Patent: May 18, 2004

(54) CURRENT COLLECTOR FOR SOFC FUEL CELLS

(75) Inventors: Martin Janousek, Reutte (AT); Wolfgang Glatz, Reutte (AT); Kaspar Honegger, Wattenwil (CH)

(73) Assignee: Plansee Aktiengesellschaft, Reutte (AT)

( * ) Notice: Subject to any disclaimer, the term of this patent is extended or adjusted under 35 U.S.C. 154(b) by 138 days.

(21) Appl. No.: 10/159,860

(22) Filed: May 31, 2002

(65) Prior Publication Data

US 2002/0182468 A1 Dec. 5, 2002

(30) Foreign Application Priority Data

May 31, 2001 (AT) ......................................... 444/2001 U

(51) Int. Cl.[7] ................................................. H01M 8/10
(52) U.S. Cl. ............................. 429/30; 429/33; 429/40; 429/32; 429/12
(58) Field of Search ............................. 429/30, 33, 40, 429/32, 12

(56) References Cited

U.S. PATENT DOCUMENTS

| 5,800,152 A | 9/1998 | Taimatu et al. |
| 6,156,448 A | 12/2000 | Greiner |
| 2002/0081762 A1 * | 6/2002 | Jacobson et al. ............ 438/32 |

FOREIGN PATENT DOCUMENTS

| DE | 197 05 874 A1 | 8/1998 |
| EP | 0 767 248 A1 | 4/1997 |
| EP | 0 880 802 B1 | 12/1998 |

* cited by examiner

*Primary Examiner*—Patrick Ryan
*Assistant Examiner*—Angela J Martin

(57) ABSTRACT

The ferritic iron alloy is particularly suitable as a material for current collectors used in SOFC solid electrolyte high-temperature fuel cells. The material has a high chromium content upwards of 22% by weight, and a molybdenum content of 1 to 10% by weight. Additionally, there is provided 0.01 to 1.5% by weight of yttrium, rare earth metals, and/or their oxides. The alloy in particular has a high resistance to corrosion under the standard cell atmospheres in the temperature range from 700° to 900° C.

9 Claims, 1 Drawing Sheet

Oxide scale thickness - exposure 20%$H_2$/80% $H_2O$
No data for CFR at 800° and 900°C.

CURRENT COLLECTOR FOR SOFC FUEL CELLS

BACKGROUND OF THE INVENTION

Field of the Invention

The invention pertains to a current collector made from ferritic iron alloy for electrically connecting and mechanically supporting a set of individual, planar SOFC high-temperature fuel cells (solid oxide fuel cells). The fuel cells comprise an anode, an electrolyte, and a cathode, operate at temperatures of between 700° C. and 900° C., and are equipped with a solid electrolyte.

In recent years, SOFC high-temperature fuel cells have experienced considerable progress in development and are beginning to become economically viable. The SOFC-type fuel cell is wherein by a plate-like structure and a solid oxide ceramic electrolyte. Different oxide ceramic electrolytes, for example doped zirconium oxide (zirconia) or cerium oxide (ceria), are used depending on the working temperature selected for the cell in the range between 500° and 1000° C. The cell voltage of an individual fuel cell is approximately 1 volt, and therefore it is always necessary for a multiplicity of individual cells with surface dimensions which are as large as possible to be stacked and electrically connected in series in order to achieve electrical voltages and power outputs that are technically useful.

In actual fact, nowadays plate-like fuel cell arrangements with a surface area of up to 1000 cm$^2$, wherein the thickness of the electrodes and of the solid electrolyte is regularly much less than 100 $\mu$m, are used. The lowest possible electrolyte thickness, which is important for the efficiency of the cell, is between 5 and 30 $\mu$m. In this context, a distinction is drawn between unsupported and supported electrolytes, e.g. of the ASE (anode supported electrolyte) type. Plate-like individual cells of this type stacked on top of one another are separated from one another by so-called current collectors, also known as connecting elements, interconnectors, or bipolar plates. The cells are mainly supplied with the required fuels and the reactive media are removed, and the cells are at the same time also mechanically stabilized, by means of open distribution passages in the current collectors.

It is therefore quite understandable that the development of suitable current collectors has in recent years been the subject of considerable attention, both with regard to the selection of material and with regard to economic fabrication thereof to form complex components. The complexity of the components is primarily determined by the generally filigree, open passage and line systems used for the gaseous media.

To be satisfactorily useable over the entire fuel cell service life, which has to be sufficiently long from an economic viewpoint, the current collectors have to meet high demands imposed on a wide range of mechanical, physical and chemical material properties and at the same time it must be possible to manufacture the current collectors at relatively low cost. The material costs alone must not make the overall fuel cells system commercially unattractive.

The indispensable high material quality demands relate to:

- high mechanical strength, in particular high rigidity of even thin current collector plates over the wide temperature range between room temperature and approx. 1000° C.
- optimum matching of the coefficient of thermal expansion to that of the solid electrolyte film: this match must be equally present at any temperature in the entire range between room temperature and working temperature.
- high thermal and electrical conductivity, low electrical surface contact resistance, including maintaining these values throughout the entire service life of a fuel cell.
- high corrosion resistance of the material with respect to the fuel gas and exhaust gas atmospheres in the cell, which on the anode side are substantially hydrogen and $H_2O$ vapor, CO and $CO_2$, and on the cathode side are substantially oxygen and air.

The development of suitable materials for current collectors was initially concentrated on chromium alloys. In recent years, the development concentration has shifted to ferritic iron alloys with significant levels of chromium.

During the efforts to further refine the proposed ferritic alloys for current collectors in SOFC-type fuel cell units, it has been important to suppress the formation of volatile chromium compounds and the vaporization of these compounds from the current collector surface as far as possible. By way of example, one countermeasure proposed has been the addition of suitable quantities of titanium and manganese.

Even with the ferritic materials, which are known to be resistant to corrosion, it has been impossible to completely avoid superficial growth of oxide. To reduce the oxide growth rate, but at the same time also to increase the mechanical strength, it has been proposed to add small quantities of the elements yttrium, cerium, lanthanum, zirconium and/or hafnium.

With materials developments of this type, the person skilled in the art has been relying on the theoretical and empirical knowledge of the action of individual metallic and nonmetallic components. Known ferritic iron-based materials with a multiplicity of additions which have by now been described, in view of the state which has been reached in the demands for matching a wide range of extremely divergent materials properties, make a prediction about measures aimed at further matching of properties impossible or at least rather dubious.

The validated prior art forms an important platform but not a reliable indicator toward materials developments of this nature.

For example U.S. Pat. No. 6,156,448 (European patent EP 0 880 802 B1) describes a high-temperature fuel cell with stabilized zirconia as solid electrolyte, wherein the current collectors consist of an iron-based alloy comprising 17 to 30% by weight of chromium, such that this material has a coefficient of thermal expansion of between 13 and 14×10$^{-6}$K$^{-1}$.

A material that is characterized in this way for current collectors has no guiding significance in the context of this description with regard to matching of properties. Even with regard to the coefficients of thermal expansion, nowadays more refined criteria apply, for example in connection with the design and material of the solid electrolyte used in each case.

U.S. Pat. No. 5,800,152 (European published patent application EP 0 767 248 A1) describes an oxidation-resistant, metallic material, in particular also for use in current collectors for high-temperature fuel cells, of the following composition: 15 to 40% by weight of chromium, 5 to 15% by weight of tungsten, 0.01% to 1% by weight of one or more elements selected from the group consisting of Y, Hf, Ce, La, Nd and Dy, remainder iron, which material has a coefficient of thermal expansion of more than 12×10$^{-6}$ and less than $13\times10^{-6}K^{-1}$ in the temperature range between room temperature and 1000° C.

As an alternative, this material must additionally contain 0.001 to 0.01% by weight of boron.

The document states that this material is specifically designed for use in combination with zirconium oxide as solid electrolyte at working temperatures of between 900° C. and 1000° C.

An article by the two inventors of the noted patent which was published after the priority date of this description (M. Ueda, H. Taimatsu, Thermal Expansivity and High-Temperature Oxidation Resistance of Fe—Cr—W Alloys Developed for a Metallic Separator of SOFC, 4$^{th}$ European SOFC Forum Lucerne, Jul. 10–14, 2000) provides a very critical report on difficulties and drawbacks of the said material as a current collector. Alloys containing more than 18% by weight of chromium are considered to be difficult to process. The report refers to layers which are formed on the material as a result of corrosion and which flake off.

Despite tests using the Cr and W contents over the entire range covered by the scope of protection of the alloy, it was impossible for the coefficient of thermal expansion of the alloy to be satisfactorily matched to the coefficient for yttrium-stabilized $ZrO_2$ solid electrolytes. According to new measurements, in the temperature range between 20° and 1000° C. this material constant varies continuously between 11.7, 10.8 and back to $11.7\times10^{-6}K^{-1}$. The resistance to oxidation, in particular under the hot $H_2/H_2O$ vapor atmosphere which is present on the anode side when the cell is operating was recorded to be unsatisfactory.

SUMMARY OF THE INVENTION

It is accordingly an object of the invention to provide a ferritic material for current collectors in high-temperature fuel cells with a solid electrolyte, which overcomes the above-mentioned disadvantages of the heretofore-known devices and methods of this general type and which better matches the high and wide-ranging demands on properties referred to in the introduction than prior art materials. The material is in particular to have a better resistance to corrosion under the fuel gas and exhaust gas atmospheres. At the same time, there is to be an electrical contact resistance which is as constant and low as possible between current collectors and cell electrodes over long periods, when these components are in surface-to-surface contact with one another in the cell arrangement. Furthermore, the material is to have a coefficient of thermal expansion that is well matched to that of known SOFC solid electrolytes and electrode materials for medium-temperature fuel cells in the working range between 700° C. and 900° C.

With the foregoing and other objects in view there is provided, in accordance with the invention, a current collector made from ferritic iron alloy for electrically connecting and mechanically supporting a stack of individual, planar SOFC high-temperature fuel cells having an anode, an electrolyte, and a cathode, and operating at temperatures of between 700° C. and 900° C., and being equipped with a solid electrolyte. According to the improvement, the ferritic material comprises:

more than 68% by weight of Fe and standard impurities;
22 to 32% by weight of Cr;
1 to 10% by weight of Mo; and
0.01 to 1.5% by weight of at least one material selected from the group consisting of yttrium, rare earth metals, and oxides thereof.

In accordance with an added feature of the invention, the solid electrolyte consists of cerium oxide doped with Gd, Ca, Sm, and/or Y.

In accordance with an additional feature of the invention, the solid electrolyte consists of zirconium oxide doped with Y, Ca, Sc, and/or Yb.

In accordance with another feature of the invention, the current collector is formed in a powder metallurgy process in a shape near net shape, i.e., the green body is produced to near final shape.

In accordance with a further feature of the invention, the ferritic material additionally includes 0.1 to 3% by weight of Nb, Ti, Ni, and/or Mn.

In accordance with a specific embodiment of the invention, the ferritic material consists of 22% by weight of Cr, 2% by weight of Mo, 0.3% by weight of Ti, 0.5% by weight of $Y_2O_3$, remainder iron.

In accordance with another specific embodiment, the ferritic material consists of 26% by weight of Cr, 2% by weight of Mo, 0.3% by weight of Ti, 0.5% by weight of $Y_2O_3$, remainder iron.

In accordance with a concomitant feature of the invention, the ferritic material consists of 26% by weight of Cr, 2% by weight of Mo, 0.3% by weight of Ti, 0.4% by weight of Nb, 0.5% by weight of $Y_2O_3$, remainder iron.

In further summary, the objects of the invention are achieved by a current collector which consists of a ferritic material that, in addition to more than 68% by weight of Fe and standard impurities, also includes 22 to 32% by weight of Cr, 1 to 10% by weight of Mo and 0.01 to 1.5% by weight of yttrium and/or rare earths and/or oxides thereof.

The ferritic iron material according to the invention easily satisfies all the property requirements which have been mentioned above for SOFC high-temperature fuel cells.

The coefficient of thermal expansion of the material according to the invention is well matched to that of oxidic solid electrolyte materials which are currently standard for high-temperature fuel cells—in particular to gadolinium-stabilized cerium oxide, which is used as electrolyte in the working range from 700° C. to 900° C., with a coefficient of thermal expansion of $12.5\times10^{-6}K^{-1}$ at 800° C., $12.7\times10^{-6}K^{-1}$ at 900° C. The coefficient of thermal expansion, which varies as a function of temperature, matches that of oxidic solid electrolytes which are customarily used with a rating of very good to satisfactory at any temperature between room temperature and 900° C.

The rating "very good to satisfactory" takes account of the compromise which may have to be reached with regard to optimization of different materials properties, such as coefficient of thermal expansion and electrical contact resistance.

As described below, the alloy according to the invention is predominantly aimed at achieving a minimum level of compromise with regard to the corrosion characteristics and the associated electrical contact resistance at the surface of the material.

Moderate compromises with regard to the coefficient of thermal expansion of the current collector nevertheless lead to unrestricted functioning of the cells if the ASE technique, which is nowadays customary, is used, in the following way.

The solid electrolyte film with a low thickness is no longer unsupported, but rather the solid electrolyte is applied as a supported film directly to an electrode surface as support material, for example as ASE (anode supported electrolyte) composite component. The thinner a film, the more elastic it becomes. In this way, different coefficients of thermal expansion between the cell components which rest against one another with surface-to-surface contact are compensated for—to a limited extent—without there being a risk of the film tearing.

In addition to the good matching of the coefficients of thermal expansion, which is indispensable for current collector materials, the most significant advantage of the ferritic iron material according to the invention compared to the prior art is a surprising and unforeseeable high resistance to corrosion with respect to fuel and exhaust gas atmospheres in the temperature range from 700° C. to 900° C., with the simultaneous formation of advantageous oxidation products in the surface region of the ferritic material.

Other features which are considered as characteristic for the invention are set forth in the appended claims.

Although the invention is illustrated and described herein as embodied in a current collector and a ferrite material for a current collector in a high-temperature fuel cell, it is nevertheless not intended to be limited to the details shown, since various modifications and structural changes may be made therein without departing from the spirit of the invention and within the scope and range of equivalents of the claims.

The invention will be better understood with reference to the following figures that show the oxidation behavior of configurations of the ferritic iron-based alloy according to the invention compared to ferritic steels which have previously been described for current collectors but also compared to a chromium-base alloy (abbreviation: CRF) which has been in widespread use for current collectors.

DESCRIPTION OF THE PREFERRED EMBODIMENTS AND EXAMPLES

Figure 1:
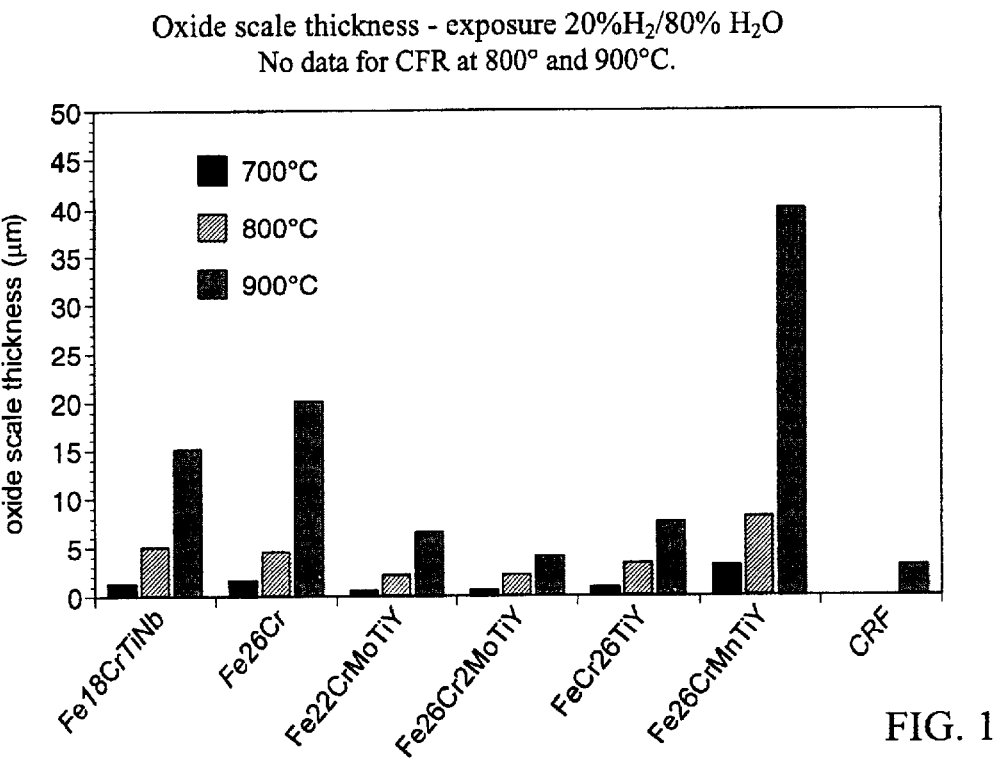
FIG. 1 is a comparative chart showing various current collector materials after oxidation for 650 hours in an atmosphere composed of 80% by volume of $H_2O$, and 20% by volume of $H_2$, at 700° C., 800° C. and 900° C.

The measure used for the oxidation behavior reproduced is the thickness of the oxidation layer formed during this time.

None of the comparison materials have an oxidation resistance which is as good as that of the ferritic alloy according to the invention. For cost reasons, the material CRF, with a high chromium content, cannot be compared and is used at cell temperatures between 900° C. and 1000° C.

The comparison material Fe26Cr did not achieve a useable result at 900° C. The oxide layers formed had already flaked off from the surface.

In addition to the thickness of the oxidation layer itself, the adhesion of the oxidation layer to the substrate core material below it is also of importance, and in the materials according to the invention this property is considerably improved compared to known ferritic materials, in particular those with aluminum and/or silicon in the alloy.

The alloy according to the invention forms oxide layers, which have an advantageous, extremely surprising influence on the amount of chromium which is inevitably vaporized from the current collector surface in the inventive alloy, under the corrosive action of a true cell atmosphere, i.e. also in the presence of water vapor. This corrosion effect, which is extremely critical to the service life of the cell, has not been accorded sufficient attention in the literature which has previously been available. Published data describe only the corrosion performance of the materials investigated under air or oxygen.

The vaporization mechanism is as follows. In all alloys with relatively high chromium contents, a volatile chromium hydroxide layer is formed on the oxide layers. Chromium which vaporizes from the surface is replaced from the interior of the material. Unlike in alloys according to the invention, in previously known chromium-containing alloys this has often led to chromium losses which were so high that as a result the alloy, and consequently its properties, were altered in an extremely undesirable way.

Nonetheless, the greatly reduced vaporization of chromium makes it necessary to set the lower limit for the alloying element chromium at 22% by weight, in order not to endanger the advantageous alloy properties produced by chromium.

According to tests carried out for orientation purposes, the different oxide layers which are formed on the alloy according to the invention according to corrosion temperature usually comprise a number of layers.

A thin $Cr_2O_3$ film is preferentially formed on the substrate, followed by a layer comprising spinels of the metals Fe, Cr, Mn, Ti, Nb, Y, which have unexpectedly low electrical contact resistances which remain relatively constant over the service life of the cell.

Iron as alloying element generally contains Mn as an impurity, with the result that manganese-containing oxide layers with a low contact resistance are generally formed.

Therefore, small amounts of one or more of the metals Ti, Mn, Nb, Ni and/or Y, generally of much less than 1% by weight, are optionally added to the alloy according to the invention in order to influence the desired formation of oxides.

The ferritic material according to the invention promotes the formation of a well-bonded inner $Cr_2O_3$ layer directly adjacent to the base material and the formation of an outer oxide layer above it, for example Mn—Cr spinel.

However, unlike oxide layers with poor bonding, for example those which locally lift off or even flake off the substrate, well-bonded oxide layers have a relatively low electrical contact resistance with respect to the interior of the material.

A parameter relating to the usability of the current collector material in high-temperature fuel cells or to the electrical power which can be taken off a cell which has hitherto been given little attention is that of having the lowest possible electrical contact resistance of the current collector in surface-to-surface contact with the adjoining electrode materials.

The alloy according to the invention not only forms thin oxide films, but also oxides in particular including spinels, with a residual electrical conductivity which is advantageous for this application.

As a development of the objective, it has been proposed to match the coefficient of thermal expansion of ferritic steel to the requirements of the solid electrolyte by corresponding additions of one or more of the high-melting metals tungsten, molybdenum, niobium or tantalum. In the present alloy according to the invention, the required coefficient of thermal expansion can substantially be matched by means of the chromium content, without, however, having to select such a high chromium content that the known drawbacks of iron-containing chromium alloys as current collectors become dominant. In the ferritic material according to the invention, the relatively small amount of the high-melting metal molybdenum is responsible for matching the coefficients of thermal expansion. This has led to the surprising discovery that even a relatively small molybdenum content starting at 1% by weight in the alloy composition according to the invention leads to the abovementioned unexpected increases in the resistance to corrosion and further physical-chemical properties.

The level of rare earths and/or oxides thereof in the ferritic iron-based material according to the invention is known with regard to the dispersing and therefore strength-increasing properties. The rare earths as constituents of the alloy according to the invention clearly also exert an unpredicted, stabilizing influence on the surface oxides which form as a result of corrosion and the physical properties thereof.

Small quantities of niobium of up to a few percent by weight have proven particularly successful for optional addition to the alloy according to the invention. They stabilize the electrical contact or the favorable electrical contact resistance between electrode material and current collector at temperatures between 700° C. and 900° C. under standard conditions of use throughout the entire service life of a fuel cell, which is nowadays fixed at at least 40,000 hours.

The alloy which comprises 26% by weight of chromium, 2% by weight of molybdenum, 0.3% by weight of titanium, 0.5% by weight of yttrium oxide, remainder iron, and also the alloy comprising 22% by weight of chromium, 2% by weight of molybdenum, 0.3% by weight of titanium, 0.5% by weight of yttrium oxide, remainder iron, and also the alloy comprising 26% by weight of Cr, 2% by weight of Mo, 0.3% by weight of Ti, 0.4% by weight of Nb, 0.5% by weight of $Y_2O_3$, remainder iron, have proven particularly successful among the inventive materials for current collectors.

Figure 2:
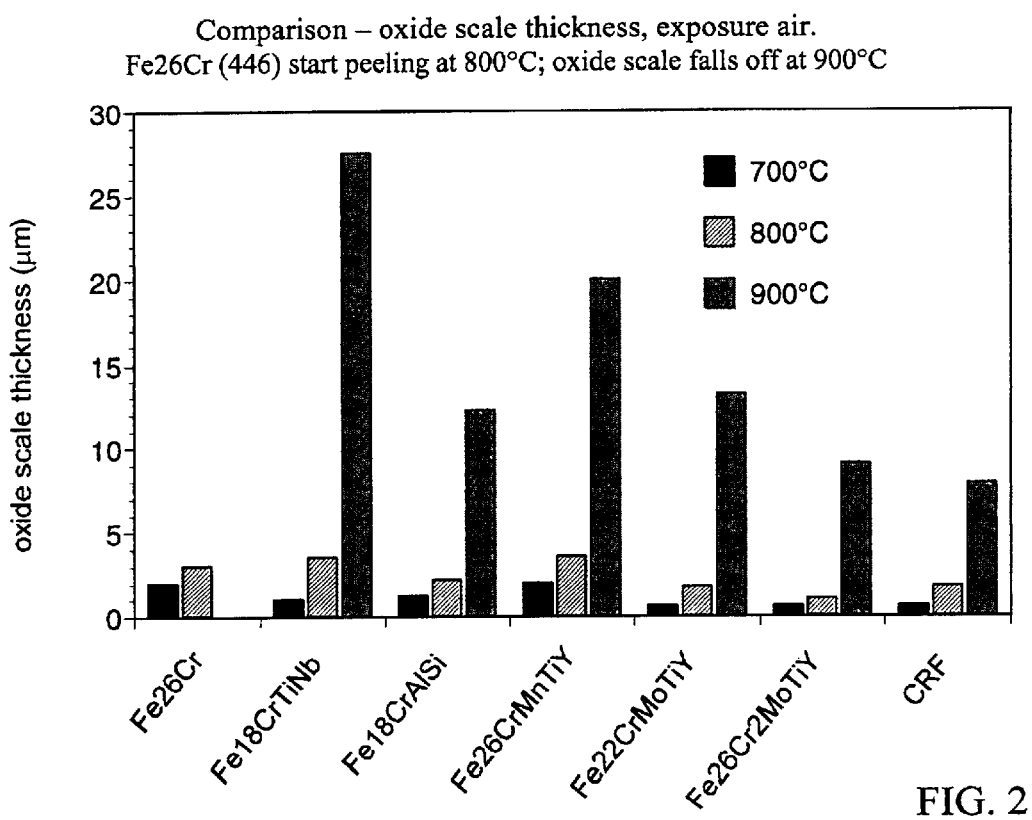
FIG. 2 is a comparative chart after oxidation for 500 hours in air, likewise at 700° C., 800° C. and 900° C.

Nowadays, current collectors are usually designed as metal plates, into the surface of which a multiplicity of open line passages for the fuel and exhaust-gas atmospheres of the fuel cell are machined. These passage systems are generally of highly filigree design. Current collector plates of this type are described, for example, in the above-mentioned European patent document EP 0 880 802, FIG. 2.

Current collector plates of this type are usually manufactured from molten alloys, with the filigree passage systems being introduced into the plate surface by cost-intensive material-removing and/or electrochemical machining.

Recently, however, it has also become known to produce current collectors with passage systems of this type by powder metallurgy. On account of the high geometric precision which manufacture of the current collector plates usually requires, production by powder metallurgy requires very careful matching of economically viable alloying compositions and suitable powder metallurgy production processes.

Substantially compact but also highly porous current collectors are produced using this process.

The passage systems in the current collector which are required to guide the gases are produced either near net shape as early as during pressing of the compact and before sintering, or are mechanically or electrochemically machined from a compact sintered blank. A process wherein a sintered blank is rolled to form sheets and the current collector net shape with gas passages is produced by stamping and punching of the sheet, is highly promising. This process allows particularly thin-walled forms of current collector.

In the case of the highly porous configurations of a current collector, the open pore systems are used to guide and distribute gases.

The ferritic iron-base alloy according to the invention is particularly suitable for the production of current collector plates by powder metallurgy.

The production of a current collector according to the invention is explained in more detail with reference to the following examples:

EXAMPLE 1

The material according to the invention, having the composition Fe, 22% by weight of chromium, 2% by weight of Mo, 0.29% by weight of Ti, 0.37% by weight of Y is processed by powder metallurgy to form the current collector component.

For this purpose, powders of an Fe—Y prealloy are mixed with the metal powders of the other alloying constituents. The alloying powders have a grain size fraction in the range from 30 to 160 $\mu$m and are mixed with pressing auxiliaries during the mixing. The powder mixture obtained in this way is pressed in press molds at a pressure of 8 t/cm$^2$ to form a near net shape current collector plate. Accordingly, all the passage systems for the gaseous media which run on the surface of the plate have already been formed in the compact. The further processing of the compacts to form finished current collector plates takes place by means of sintering at temperatures of 1400° C. in a hydrogen atmosphere. If necessary, the current collector plates obtained in this way undergo further (non mechanical) treatment before being assembled to form fuel cell units.

EXAMPLE 2

An alloy of the composition Fe, 26% by weight of Cr, 2% by weight of Mo, 0.25% by weight of Y, contains as impurities 0.08% by weight of Mn, 0.05% by weight of Nb. This alloy is pressed by powder metallurgy to form a cylindrical compact and the compact is then processed into a sintered blank by sintering in an $H_2$ atmosphere at 1400° C. The sintered blank is cut into disks, and the surface gas-guiding passages are produced by means of mechanical or electrochemical processes. Two current collectors which have been manufactured in this way, as cover plates, are combined with the thin films comprising anode and cathode material and with a gadolinium oxide-stabilized cerium oxide SOFC electrolyte to form a cell unit and are tested at a cell temperature of 800° C. under the standard fuel gas and exhaust gas atmospheres for an operating time of 650 hours. In addition to the mechanical stability of the individual cell components, in particular the corrosion properties of the current collector plates were extensively tested. The corrosion values determined correspond to those represented in FIGS. 1 and 2.

The present invention is not restricted to the exemplary embodiment described above, but rather also encompasses other embodiments which the person skilled in the art will readily understand as also being encompassed by the subject matter of the invention, such as for example, components which are manufactured from precursor material which has undergone hot isostatic pressing (HIP).

We claim:

1. In a current collector made from ferritic iron alloy for electrically connecting and mechanically supporting a stack of individual, planar SOFC high-temperature fuel cells having an anode, an electrolyte, and a cathode, and operating at temperatures of between 700° C. and 900° C., and being equipped with a solid electrolyte, the improvement wherein the ferritic material comprises:

more than 68% by weight of Fe and standard impurities;

22 to 32% by weight of Cr;

1 to 10% by weight of Mo; and 0.01 to 1.5% by weight of at least one material selected from the group consisting of yttrium, rare earth metals, and oxides thereof.

2. The current collector made from ferritic iron alloy according to claim 1, wherein the solid electrolyte consists of cerium oxide doped with at least one material selected from the group consisting of Gd, Ca, Sm, and Y.

3. The current collector made from ferritic iron alloy according to claim 1, wherein the solid electrolyte consists of zirconium oxide doped with at least one material selected from the group consisting of Y, Ca, Sc, and Yb.

4. The current collector made from ferritic iron alloy according to claim 1, produced by a powder metallurgy process in a shape near net shape.

5. The current collector made from ferritic iron alloy according to claim 1, wherein the ferritic material additionally includes 0.1 to 3% by weight of a material selected from the group consisting of Nb, Ti, Ni, and Mn.

6. The current collector made from ferritic iron alloy according to claim 1, wherein the ferritic material consists of 22% by weight of Cr, 2% by weight of Mo, 0.3% by weight of Ti, 0.5% by weight of $Y_2O_3$, remainder iron.

7. The current collector made from ferritic iron alloy according to claim 1, wherein the ferritic material consists of 26% by weight of Cr, 2% by weight of Mo, 0.3% by weight of Ti, 0.5% by weight of $Y_2O_3$, remainder iron.

8. The current collector made from ferritic iron alloy according to claim 1, wherein the ferritic material consists of 26% by weight of Cr, 2% by weight of Mo, 0.3% by weight of Ti, 0.4% by weight of Nb, 0.5% by weight of $Y_2O_3$, remainder iron.

9. A fuel cell stack, comprising:

a plurality of planar SOFC high-temperature fuel cells each having an anode, a solid electrolyte, and a cathode, and operating at temperatures between 700° C. and 900° C.;

a current collector electrically connecting and mechanically supporting said fuel cells, said current collector being formed of a ferritic iron alloy comprising 22 to 32% by weight of Cr; 1 to 10% by weight of Mo; 0.01 to 1.5% by weight of at least one material selected from the group consisting of yttrium, rare earth metals, and oxides thereof; and remainder iron and standard impurities.

* * * * *